Aug. 16, 1966  W. F. ALLER  3,266,854
MACHINE SYSTEM
Filed Nov. 29, 1963
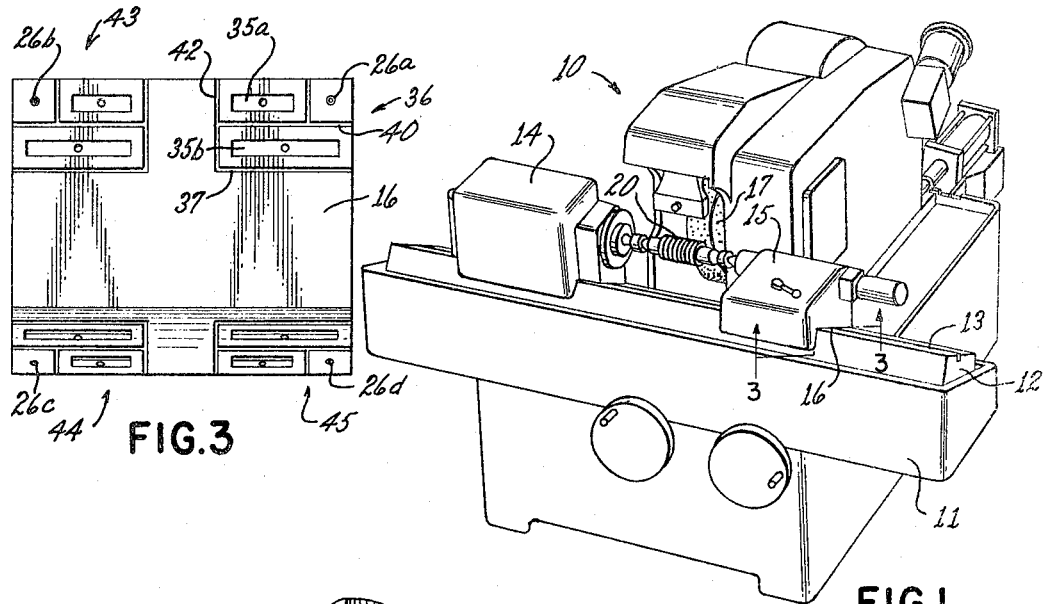
FIG.3
FIG.1
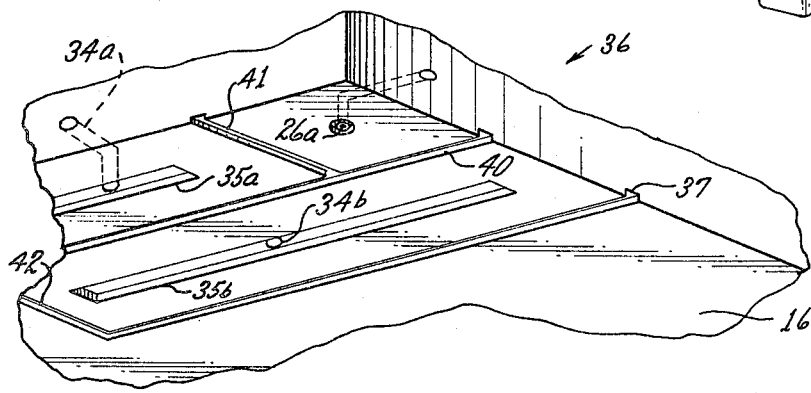
FIG.4
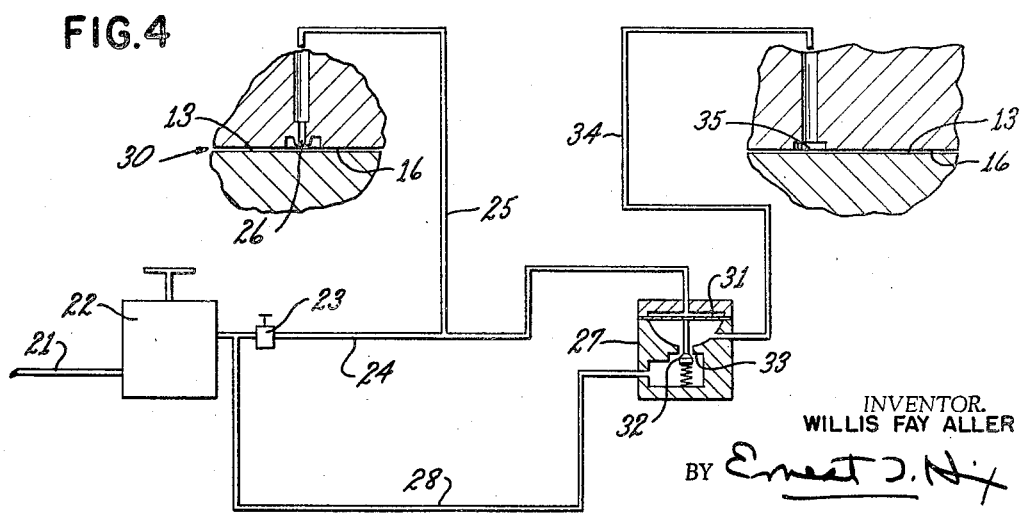
FIG.2
INVENTOR.
WILLIS FAY ALLER
BY Ernest J. Nix
HIS ATTORNEY

United States Patent Office 3,266,854
Patented August 16, 1966

3,266,854
MACHINE SYSTEM
Willis Fay Aller, Dayton, Ohio, assignor to The Sheffield Corporation, Dayton, Ohio, a corporation of Delaware
Filed Nov. 29, 1963, Ser. No. 326,822
3 Claims. (Cl. 308—5)

This invention relates to mechanical support structures and more particularly to supports using fluid bearings wherein a fluid is dynamically supplied between the supported and supporting bearing surfaces.

One object of this invention is the provision of a simple, efficient, fluid bearing support which is inexpensive to produce and operate for use in maintaining highly accurate relative spacing between supported and supporting bearing components, particularly for maintaining such spacing under varying load and load distribution conditions.

Another object of this invention is the provision of such a fluid bearing wherein separating fluid such as air dynamically supplied between supported and supporting bearing members is continuously controlled in accordance with the responsive of means sensing the spacing therebetween whereby said spacing is continuously and precisely controlled under varying load conditions.

Another object of this invention is the provision of such a fluid bearing wherein separate bearing zones are provided between said members, the separating fluid supplied to each of said zones being independently controlled by sensing means for that zone for maintaining the desired optimum spacing and relative rigidity between said members irrespective of disturbing influences such as varying load or force conditions or distribution.

Another object of this invention is the provision of such a fluid bearing support system in which the same fluid medium provided for bearing support is used to sense and control the relative displacement between a supporting and supported member.

Another object of this invention is the provision of such a fluid bearing support using an inexpensive fluid such as air as the common fluid and in which the sensing means comprise an air orifice responsive to pressure conditions in an air bearing zone to provide an air pressure.

Another object of this invention is the provision of such an air bearing support in which the sensing means comprise an air orifice responsive to flow conditions in an air bearing zone to provide a feedback error signal of deviation from a desired spacing between the bearing members, and the air bearing support is provided through air pressure pads controlled by an air actuated device directly responsive to said feedback signal.

Another object of this invention is the provision of a fluid bearing support system of the character mentioned in which said sensing means also provides bearing support.

Other objects and advantages of this invention will be apparent from the following description, the appended claims, and the accompanying drawings, in which:

FIG. 1 is an exemplary illustration of a machine tool embodying the features of this invention, FIG. 2 is a diagram schematically illustrating operative components of this invention, FIG. 3 is a view of a portion of the machine looking upward generally as indicated by line 3—3 of FIG. 1, and FIG. 4 is an enlarged perspective of a portion of FIG 3.

While the present invention has various applications in instruments, machine tools, etc., in providing precision friction-free support, it is illustrated and will now be described as embodied in a grinding machine 10 having a base 11 including a supporting member or longitudinal way 12 as an integral part thereof. Supporting member 12 has a bearing surface 13 on which supported members such as headstock 14 and tailstock 15 are mounted for longitudinal movement.

In the illustrative example tailstock 15 is carried by a fluid bearing support embodying the present invention. Other components can be similarly supported as desired. Referring particularly to tailstock 15 it has an opposed bearing surface 16 which is supported for frictionless movement by surface 13. A grinding wheel 17 is mounted on the base for movement toward and away from a workpiece 20 held between centers on the headstock 14 and tailstock 15. As the workpiece is ground to a predetermined configuration the load carried by the headstock and tailstock varies and hence problems are introduced by changes in the force exerted against the supporting surface with continued stock removal. This invention solves these problems.

The schematic diagram of FIG. 2 illustrates operative components of the invention wherein a common fluid such as air is used for sensing the relative displacement for load carrying, and also to control the distance between supporting and supported members. Air is supplied through a common supply line 21 to a pressure regulator 22 for regulation thereof to within predetermined acceptable limits as required by the particular application involved. An adjustable restrictor 23 is installed downstream of regulator 22 in a line 24 from the regulator. Restrictor 23 limits the amount of regulated air provided to sensing means including a fluid passage 25 terminating in a sensing orifice 26. Orifice 26 provides a feedback pressure signal downstream of restrictor 23 to a fluid relay 27 which varies with the relative displacement indicated at 30 between the opposed bearing surfaces 13 and 16. Relay 27 is directly actuated by pressure changes caused by changes in displacement at 30, in a manner characterized by a typical back pressure circuit.

As the displacement between supporting surface 13 and supported surface 16 decreases, for example, flow out of orifice 26 is decreased simultaneously increasing the pressure in line 24 to increase the force acting against a diaphragm 31 in relay 27. Likewise as the displacement 30 increases, flow out of orifice 26 increases simultaneously decreasing the pressure in line 24 to reduce the force acting against diaphragm 31. A valve stem 32 connected in the opposite side of diaphragm 31 is spring urged upwardly and cooperates at its lower end with a valve seat 33 in relay 27 to control air flow therethrough from line 28 and adjustable regulator 22 in direct response to diaphragm displacement which in turn reflects the displacement between the supporting and supported surfaces. Increases in pressure on diaphragm 31 reflecting a decrease in displacement between the opposed bearing surfaces result in relative separation of valve elements 32, and 33, with an increase in separating flow from relay 27 to re-establish the desired displacement, similarly an increase in displacement results in reduction of separating flow. Separating fluid under pressure is thus supplied from relay 27 through passage means shown as a line 34 terminating in an outlet opening 35, and between supporting and supported bearing surfaces 13 and 16, which is controlled in accordance with the measured displacement between these surfaces as previously described to maintain this displacement constant. With any variation from the desired displacement 30, the separating pressure between surfaces 13 and 16 is controlled to re-establish the desired displacement in accordance with the feedback signal from air outlet orifice 26.

Supported surface 16 on tailstock 15 includes a plurality of fluid bearing zones, one of which is illustrated in perspective at 36 in FIG. 4. Zone 36 is defined by air channel passages 37, 40, 41, and 42 to atmosphere in surface 16. One arrangement using a single sensing orifice 26a is illustrated operating in conjunction with fluid means including passages 34a and 34b, each intersecting a lifting outlet opening 35a and 35b both controlled through the response of sensing orifice 26a. It may be desirable in some applications to use more than one sensing orifice to sense fluid conditions between supporting and supported surfaces.

The fluid bearing zones 36, 43, 44, and 45 of tailstock 15 as illustrated in FIG. 3, each operates independently having operating components and connecting passages as shown in FIG. 2 and previously described. These zones provide separating forces between opposed bearing surfaces 13 and 16 and lift the tailstock 15 with respect to surface 13. Sensing orifices 26a, 26b, 26c, and 26d, preferably operate independently each with separate pressure regulators to control the spaced relation at each zone. Restrictor 23 and regular 22 for each zone may be simply adjusted to precisely hold a supported surface to high accuracies instead of undertaking extensive precision machining of surfaces to achieve such accuracies, and the spacing is maintained as desired under changes in load distribution through the independent control of displacement at each zone. In some applications it may be desirable for even greater economy and simplicity to connect sensors from a plurality of zones to a single pressure regulator thus supplying separating fluid from the same given pressure regulated source.

Thus it is seen that a dynamic fluid bearing support system is provided wherein the optimum in rigidity is achieved between a supporting surface and a supported surface by sensing displacement and controlling the separating force between the surfaces to maintain the displacement constant. This automatically compensates for changing forces and load conditions. Such conditions would occur in the illustrated example as by change in force exerted against supporting surface 13 caused by stock removal and shift of center of gravity during operation and by workpieces having widely varying configurations. Independent zone control further contributes to maintaining constant desired spacing or displacement under varying conditions. This support system achieves maximum in simplicity and efficiency by utilizing the same fluid for sensing as is used for applying separating forces.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A fluid bearing support comprising,
  a supporting member,
  a supported member,
  said members having cooperating opposed bearing surfaces thereon,
  first fluid passage means in one of said members for supplying fluid under pressure between said opposed surfaces to each of a plurality of independent fluid bearing zones therebetween for maintaining said members in spaced relation from each other and relatively movable in a frictionless manner with respect to each other,
  each of said bearing zones having fluid exhaust means to atmosphere independent of each of the other bearing zones defining the boundary of said bearing zone such that fluid flow from said first fluid passage means to each zone exerts pressure between said opposed surfaces only within that respective zone,
  second fluid passage means including at least one independent sensing orifice within each zone in said one member cooperating between said members to provide a signal responsive to said spaced relation, exhaust means in said one member exhausting to atmosphere and isolating said sensing orifice from fluid flow from said first passage means wherein said sensing orifice provides a signal directly responsive to said spaced relation of said opposed surfaces and independent of influences of flow from said first passage means,
  a common fluid supply passage operatively connected to said first and second passage means,
  a fluid flow control element for each of said zones,
  means operatively connecting each of said control elements to said second fluid passage means and the sensor for its respective zone for response to signals provided thereby and the spaced relations of said members at said zone,
  and means operatively connecting each of said control elements to said first passage means for independently controlling the fluid supplied between said opposed surfaces and the spaced relation at the respective zone in accordance with the signals provided by the respective sensor.

2. A fluid bearing support using a common fluid for sensing, load carrying, and control comprising,
  a supporting member,
  a supported member,
  said members having cooperating opposed bearing surfaces thereon,
  first fluid passage means including a plurality of passages in one of said members each terminating in an outlet opening therein for supplying separating fluid pressure between said opposed surfaces at each of a plurality of independent fluid bearing zones therebetween for maintaining said members in spaced relation from each other at each zone and relatively movable in a frictionless manner with respect to each other,
  first fluid channel means exhausting to atmosphere provided in said bearing surface in one of said members and defining said bearing zones such that the separating fluid issuing from said first fluid passage means exerts pressure only within said bearing zone and is then exhausted to atmosphere through said first fluid channel means,
  second fluid passage means including a passage terminating in at least one independently repsonsive sensing orifice at each zone in said one of said members cooperating between said members to provide a signal responsive to said spaced relation at each respective zone,
  second fluid channel means exhausting to atmosphere provided in said bearing surface in one of said members and within said bearing zone defined by said first fluid channel means to isolate said sensing orifice from the bearing surface acted upon by the separating fluid whereby said sensing orifice provides a signal directly responsive to said spaced relation of said opposed surfaces and independent of influences of said separating fluid flow,
  common supply means operatively connected to said first and second passage means for supplying fluid under pressure to said lifting outlet openings and sensing orifices,
  a fluid flow control element for each of said zones,
  means operatively connecting each of said control elements to said second fluid passage means and the sensor for its respective zone for response to signals provided thereby and the spaced relations of said members at said zone,
  and means operatively connecting each of said control elements to said first passage means for independently controlling the fluid supplied between said opposed surfaces and the spaced relation at the respective zone in accordance with the signals provided by the respective sensor.

3. A fluid bearing support as set forth in claim 1 further comprising means for independently adjusting fluid flow to each respective bearing zone whereby the basic displacement to be maintained between the surfaces of each zone can be independently controlled.

References Cited by the Examiner

UNITED STATES PATENTS 3,113,808  12/1963  Carroll _____ 308—9

FOREIGN PATENTS 906,818  9/1962  Great Britain.
331,637  9/1958  Switzerland.

OTHER REFERENCES

Product Engineering, 1953 Handbook, pages J2 through J5.

DAVID J. WILLIAMOWSKY, *Primary Examiner.*

FRANK SUSKO, *Examiner.*